(No Model.)

E. F. HOPKINS.
THILL COUPLING.

No. 372,150. Patented Oct. 25, 1887.

Witnesses.
A. Ruppert.
Chas. Rhodes

Inventor.
E. F. Hopkins
Per
Thomas P. Simpson
Atty

UNITED STATES PATENT OFFICE.

EDWIN FAY HOPKINS, OF OBERLIN, OHIO, ASSIGNOR TO GEORGE W. GIBSON AND ALLAN R. NEWTON.

THILL-COUPLING.

SPECIFICATION forming part of Letters Patent No. 372,150, dated October 25, 1887.

Application filed July 5, 1887. Serial No. 243,455. (No model.)

*To all whom it may concern:*

Be it known that I, EDWIN FAY HOPKINS, a citizen of the United States, residing at Oberlin, in the county of Lorain and State of Ohio, have invented certain new and useful Improvements in Thill-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to improve the usual means for attaching thills or poles to vehicles by making an attachment which may be quickly, easily, and conveniently manipulated, while it will not be liable to rattle or uncouple.

Figure 1:
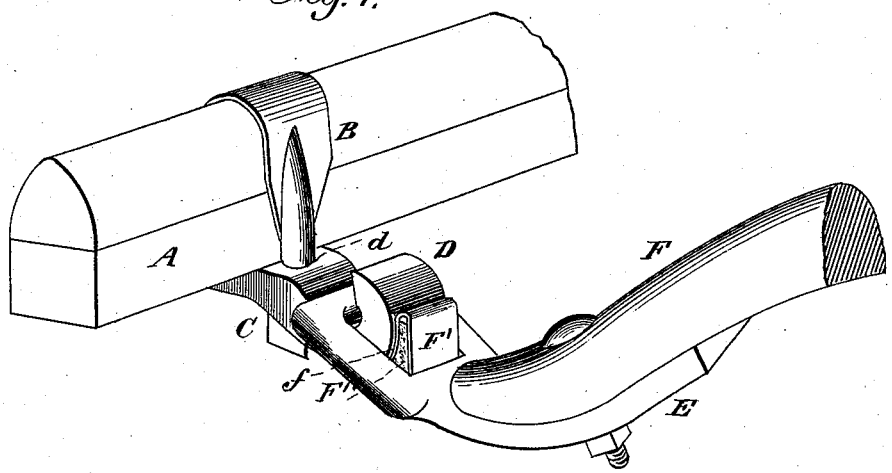
Figure 2:
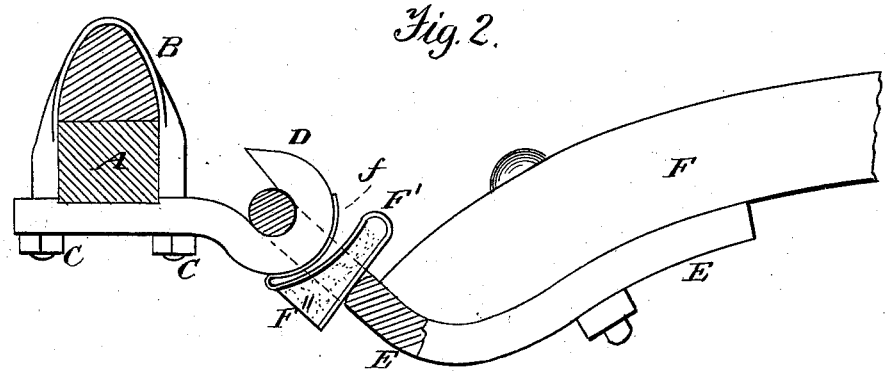
Figure 3:
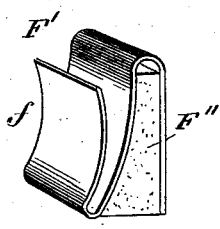

Figure 1 of the drawings is a perspective view showing my invention applied; Fig. 2, a median longitudinal vertical section, and Fig. 3 a detail perspective view of the spring.

In the drawings, A represents the axle, and B the axle-clip having threaded ends, on which may be used the nuts C C.

D is a hook having in its shank two holes, *d d*, through which pass the threaded ends of the clips before the nuts C are applied. The hook D thus projects from the under side of the axle with its curved end upward.

E is a thill-iron bolted to a shaft, F, on the under side of its rear end, and provided with an upturned loop, whose opening is preferably rectangular and receives the hook D.

In order to hold the loop and hook firmly connected together and without danger of uncoupling or the possibility of rattling, I employ a compound spring, formed of the plate-spring F' and the rubber spring F'', the former being bent or folded so as to clasp the latter and take a bearing upon the hook and inner wall of loop. By this means the durability of the rubber is more than doubled, while the usually rapid wear where it turns against the hook is entirely avoided. I preferably double the lower end of the plate-spring, so as to form a concave bottom ply, *f*, which conforms to the curvature of the hook when compressed into place. In order to uncouple, the thills are thrown back against the dash of the vehicle; and the reverse movement is made when it is desired to couple. The loop, when in use, draws straight with the hook, the thill standing at a considerable angle.

Having thus described all that is necessary to a full understanding of my invention, what I claim as new, and desire to protect by Letters Patent, is—

In a thill-coupling, the combination of a hook on the clip-plate, an upwardly-turned loop on the thill-iron to receive said hook, and a cushioned plate-spring, all constructed and arranged as shown and described.

In testimony whereof I affix my signature in presence of two witnesses.

EDWIN FAY HOPKINS.

Witnesses:
J. H. LANG,
A. RUPPERT.